United States Patent
Dijkman et al.

(10) Patent No.: US 6,485,646 B1
(45) Date of Patent: Nov. 26, 2002

(54) PROCESS FOR THE TREATMENT OF WASTE WATER CONTAINING AMMONIA

(75) Inventors: Hendrik Dijkman, Ijlst (NL); Marc Strous, Utrecht (NL)

(73) Assignee: Paques Bio Systems B.V., Balk (NL)

(*) Notice: Subject to any disclaimer, the term of this patent is extended or adjusted under 35 U.S.C. 154(b) by 0 days.

(21) Appl. No.: 09/744,402
(22) PCT Filed: Jul. 13, 1999
(86) PCT No.: PCT/NL99/00446
§ 371 (c)(1), (2), (4) Date: Mar. 30, 2001
(87) PCT Pub. No.: WO00/05176
PCT Pub. Date: Feb. 3, 2000

(30) Foreign Application Priority Data

Jul. 24, 1998 (EP) .............................................. 98202500

(51) Int. Cl.$^7$ .................................................. C02F 3/00
(52) U.S. Cl. ........................ 210/610; 210/623; 210/758; 210/220; 210/626; 435/266; 435/262
(58) Field of Search .................. 610/623, 605, 610/610, 620, 758, 220, 626; 435/262, 266

(56) References Cited

U.S. PATENT DOCUMENTS

| | | | |
|---|---|---|---|
| 3,764,523 A | 10/1973 | Stankewich, Jr. | |
| 5,186,821 A | 2/1993 | Murphy | |
| 5,747,311 A | * 5/1998 | Jewell | 210/600 |
| 5,863,435 A | * 1/1999 | Hijnen et al. | 210/605 |
| 6,013,512 A | * 1/2000 | Turschmid et al. | 210/615 |
| 6,190,554 B1 | * 2/2001 | Mandt | 210/195.1 |
| 6,254,775 B1 | * 7/2001 | McElvaney | 210/603 |

FOREIGN PATENT DOCUMENTS

WO WO 98/07664 2/1998

OTHER PUBLICATIONS

XP-002030429, Delft Integraal, Schrauwers A: "En Reactor Stikstofverwijderingsproces Paart Eenvoud Aan Schoonheid", vol. 12, No. 1, 1995, pp. 3-7.

* cited by examiner

Primary Examiner—Chester T. Barry
(74) Attorney, Agent, or Firm—Young & Thompson

(57) ABSTRACT

A process is described for the biological treatment of waste water containing ammonia, wherein the waste water is treated with sludge containing nitrifying bacteria in an aerated reactor, applying a sludge retention time in the reactor which favours nitrite-producing bacteria over nitrate-producing bacteria. The process is characterised by applying a hydraulic retention time in a continuously operated reactor, which is shorter than the sludge retention time as a result of part of the sludge being separated from the reactor effluent and being returned to the reactor. The performance of the nitrification is further improved by applying low oxygen and nitrite concentrations.

14 Claims, 2 Drawing Sheets

PROCESS FOR THE TREATMENT OF WASTE WATER CONTAINING AMMONIA

Figure 1:
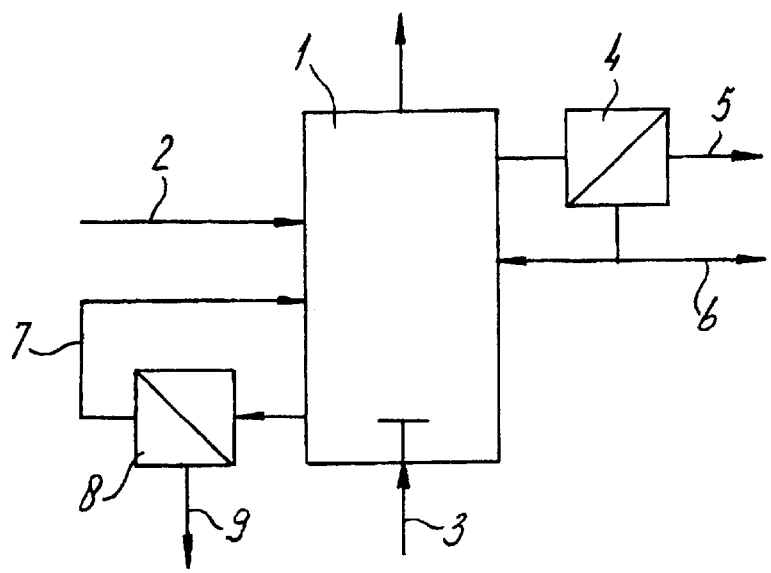

The invention relates to a process for the treatment of water containing ammonia by nitrifying bacteria, wherein ammonia is predominantly oxidised to nitrite.

Such a process is known from EP-A-826639. According to this known process, the waste water is treated in a continuously stirred tank reactor (CSTR) without sludge retention, with adjustment of the hydraulic retention time at about 1½ days. Under such conditions the bacteria which convert ammonia to nitrite, including e.g. the genus Nitrosomonas, have a sufficient growth rate to compensate for the sludge loss from the reactor, while the bacteria which convert nitrite to nitrate, including e.g. the genus Nitrobacter, do not have a sufficient growth rate to be maintained in the reactor. As a result, conversion of nitrite to nitrate is suppressed, which has the advantages of reduced oxygen consumption and reduced electron donor (COD) demand in a downstream denitrification process. This process is sometimes referred to as Single reactor for High activity Ammonia Removal Over Nitrite (SHARON) process.

A drawback of this known process is that the required hydraulic retention time of 1–2 days necessitates the use of large reactors which are loaded to a low level only. This is especially disadvantageous in the treatment of relatively diluted waste water.

Another approach is the use of selected micro-organisms (EP-A-562466). In this process specific mixtures of micro-organisms (such as Pseudomonas, Acinetobacte); Moraxella, Corynebacteriuni, Micrococcus, Flaiobacteriuni and Bacillus) are grown in separate reactors (so called propagators) and continuously or discontinuously dosed from these reactors into the waste water treatment plant. Drawbacks of such a process are the laborious (and therefore costly) cultivation of the selected micro-organisms and the relatively ineffective use of the bioreactors.

EP-A-503546 describes a process characterised in that a waste water containing a high concentration of nitrogen (i.e. reject water) is stored in a tank in which subsequently nitrification/denitrification takes place. The produced biomass is continuously or periodically transferred to the waste water treatment plant. The setbacks are comparable to the setbacks of the SHARON process referred to above, i.e. low sludge concentration, relatively large reactor volume and poor settling characteristics.

A process has been found now which overcomes these drawbacks. In the process of the invention the hydraulic retention time is shorter than the sludge retention time. The sludge retention time is always shorter than the doubling time of the nitrate-producing bacteria. This is effected by separating part of the sludge from the reactor effluent and continuing the use of the separated part in the reactor. The doubling time of the nitrate-producing bacteria can be increased by decreasing the oxygen and nitrite concentrations in the reactor. A low oxygen concentration, especially below 5% air saturation i.e. below 0.4 mg/l, can be effected by supplying less oxygen than the ammonium-oxidising bacteria can consume. A low nitrite concentration can be effected e.g. by combining the nitrification with denitrification in the nitrification reactor, or by recycling liquid from a separate denitrification step.

The essential step of the process of the invention is that the sludge retention time in the nitrification reactor is controlled independently from the hydraulic retention time. The sludge retention time, oxygen and nitrite concentrations are controlled in such a way, that nitrite is the predominant end product of nitrification, in a reactor with a relatively short hydraulic retention time. Thus the reactor dimensions can be reduced and the productivity of the reactor increased. The sludge retention time can be shortened with respect to the hydraulic retention time by separating sludge from the reactor effluent discontinuously or, preferably, continuously, and retaining part of the sludge in the reactor. The part. of sludge that is retained is at least 20 wt. %, preferably between 50 and 99 wt. %, and especially between 65 and 95 wt. % of the total sludge in the reactor.

In a preferred embodiment the process is carried out in an optionally mixed continuous reactor, which is equipped with a sludge separator. The separator causes a partial retention of the sludge in such a manner that nitrifying bacteria remain dominant in the reactor. The sludge separator can be an external separator, from which part of the separated sludge is returned to the reactor. It can also be an internal separator, e.g. a settling chamber in proximity to the liquid outlet of the reactor. In addition to sludge separation and partial recycling thereof from the reactor effluent, sludge can also be taken from the bottom part of the reactor and returned to the reactor after part thereof has been removed.

The water to be treated according to the invention can be any waste water, both of municipal and from industrial, agricultural or any other origin, which contains appreciable levels of ammonia, in particular 50 mg/l or more, or any other aqueous liquid containing these levels of ammonia, such as water used for scrubbing ammonia-containing gas. The water may or may not contain other contaminants and/or organic material. The bacteria to be used in the nitrification reactor comprise nitrifying bacteria such as those of the genus Nitrosonionas as usually present in mixed cultures. They can be obtained from common activated sludge sources.

The hydraulic retention time is shorter than the bacterial sludge retention time. The sludge retention time is between 1 and 2 days with high oxygen and nitrite concentrations (more than 30% air saturation and more than 50 mg $NO_2^-$ N/l), and can be increased up to 20–30 days with decreasing air saturation and nitrite concentrations (down to about 1% air saturation and less than 30 mg $NO_2^-$N/l). The hydraulic retention time is preferably less than half the sludge retention time, for example less than 3 days, preferably less than 1 day, especially from 1 h to 12 h, more particularly from 2 to 8 h. The sludge content of the nitrification reactor generally is between 1 and 30 g/l.

The nitrite and nitrate (if any) produced in the nitrification reactor can be further treated, e.g. by bacterial denitrification to produce nitrogen. Bacterial denitrification can occur in two ways, either by reduction of nitrite (and nitrate) using organic electron donors such as COD: organic waste, carbohydrates, alcohols (especially methanol), etc., as reduction equivalents, or by providing the necessary reduction equivalents as ammonia, which is itself oxidised to produce dinitrogen. The denitrification can be performed by treating the effluent of the nitrification reactor in an anoxic reactor containing denitrifying bacteria. Alternatively, the nitrification reactor can periodically be operated as a denitrification reactor by making it anoxic, i.e. by interrupting the oxygen supply and adding an electron donor (COD or the like).

The biological conversion of ammonia and nitrite to nitrogen (also referred to as the "Anammox" process) can be performed by treating the nitrification effluent (containing nitrite and unreacted ammonium corresponding to the stoichiometry of the Anammox reaction: $NO_2^- + NH_4^+ \rightarrow N_2 + 2$ H₂O) in a separate reactor to produce dinitrogen gas. Alternatively, the nitrification reactor can be operated under alternating oxic and anoxic conditions or continuously under oxygen-limiting conditions. In that case, the oxygen consumption by the nitrifying organisms generates anoxic conditions for the Anammox process. Bacteria capable of catalysing the Annamox reaction can also be obtained from common sludge sources; they include planctomycete bacteria. The Anammox reaction corresponds to the second step of the process of WO 98/07664, which is incorporated herein by reference for further details.

The nitrification reactor effluent may also be further treated in a conventional activated sludge plant, optionally together with COD waste water.

Thus, three main variants of the process of the invention can be distinguished: firstly, relatively high dissolved oxygen levels can be used (in the order of 2–6 mg/l), resulting in the production of nitrite (and perhaps some nitrate) with short sludge retention times in the order of 1–2 days; the nitrite can then be treated separately; secondly, intermediate dissolved oxygen levels can be used (in the order of 0.4–2 mg/i), with production of nitrite only and sludge retention times of between 2 and about 20 days; again the nitrite can be treated afterwards, e.g. in an Anammox process; thirdly, at dissolved oxygen levels below about 0.4 mg/l, dinitrogen production in the same reactor is predominant with sludge retention times between about 20 to 30 days.

In an advantageous embodiment of the invention, the process is used in the treatment of ammonia-containing gas. The ammonia-containing gas is contacted with water in a spray column. The water in which the ammonia is absorbed is then treated as described above. Alternatively, the ammonia-containing gas can be contacted with water in a packed column. Nitrifying bacteria grow on the packing material, thus combining the scrubbing step and the nitrifying step. In order to control the sludge retention time, the packing material can be continuously or discontinuously removed from the reactor and reintroduced in the reactor after removal of (part of) the biomass. Such a process of recycling carrier material for biomass is described in EP-A-785911.

Figure 2:
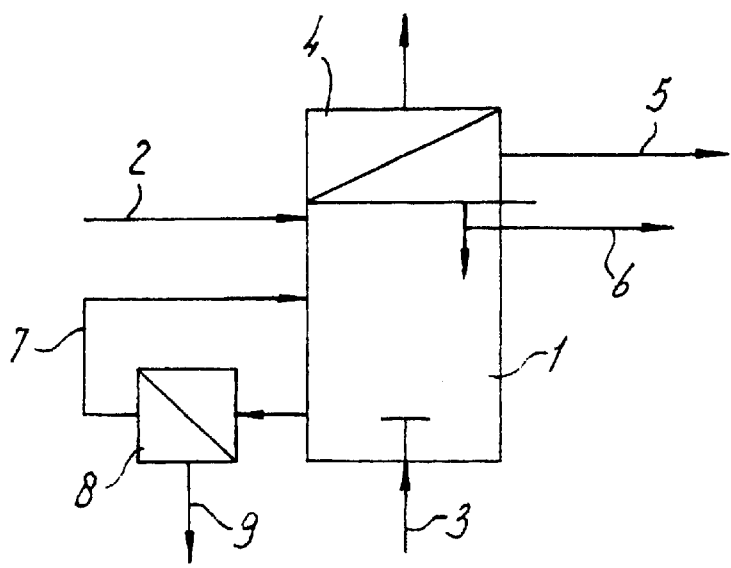

An installation for carrying out the process of the invention is depicted in FIGS. 1 and 2, wherein 1 is the nitrification reactor having a waste water supply line 2, a gas (air, oxygen) inlet 3, a separator 4 (internal, as in FIG. 2, or external, as in FIG. 1), a liquid outlet 5 and a surplus sludge outlet 6, and an optional bottom loop 7 for separating sludge, equipped with a separator 8 and a surplus sludge outlet 9. The separator 4 of FIG. 2 may be a three-phase separator (sludge/liquid/gas). The sludge retention time is adjusted by adjusting the sludge removal through outlets 6 or 9. In the nitrification reactor 1, denitrification can also occur by periodically making the reactor anoxic.

Figure 3:
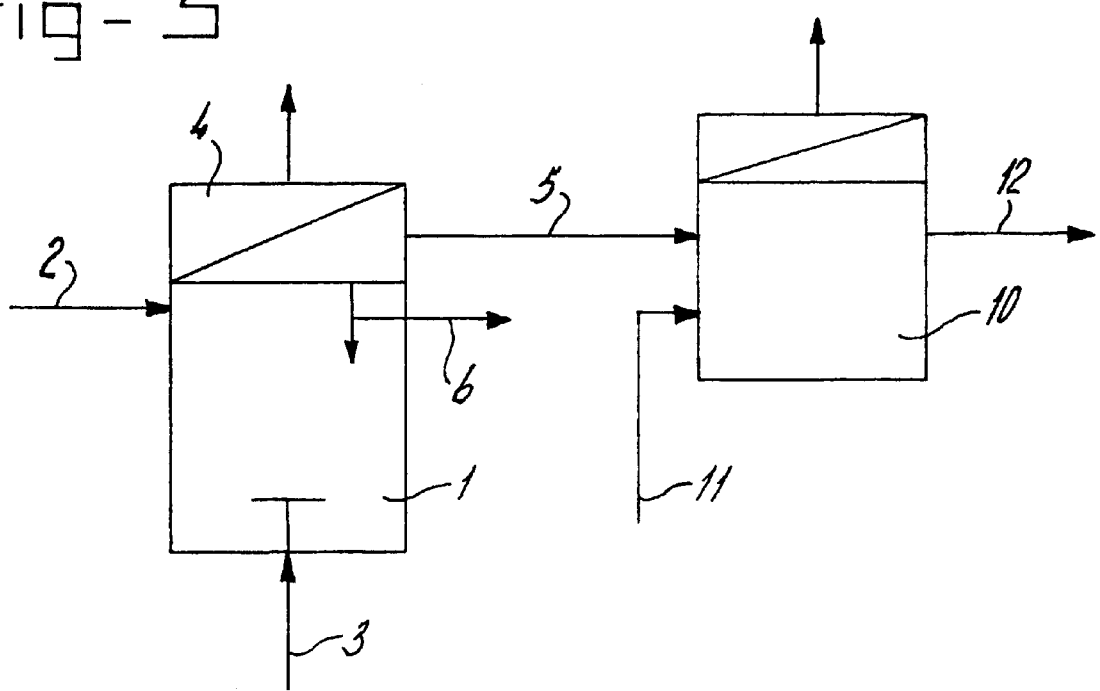

FIG. 3 shows an installation in which the treated liquid is further treated in an Anammox reactor 10 with optional inlet 11 for ammonia-containing liquid and outlet 12.

EXAMPLE 1

A 7.5 litre reactor was fed continuously with 1.5 l/h (HRT 5 h) water containing 200 mg/l ammonium. The reactor was inoculated with a population of nitrifying bacteria. In a settling system downstream the reactor the sludge was separated from the reactor effluent and all sludge was continuously returned to the reactor. Over 95% of the ammonium was converted to nitrate within two weeks. From that point a part (about 15%) of the sludge was removed from the settler and about 85% was returned to the reactor. The sludge retention time was set at 1.5 days. Within two weeks over 95% of the ammonium was converted to nitrite instead of nitrate. The temperature was controlled at 35° C., the pH at 7.5.

EXAMPLE 2

Integration of Nitrification and Anammox

A 2 litre sequencing batch reactor (SBR) was inoculated with 1 g sludge from a 15 l denitrifying SBR. The cycle time was 12 h. In each cycle, the SBR was filled continuously at a rate of 1l/day for 11.5. After 11.5 h, the stirrer was stopped and the sludge was allowed to settle. After 15 minutes, the effluent was pumped out of the reactor and the next cycle started. The hydraulic retention time was 2 days, the sludge retention time was more than 20 days.

During 6 months of operation, the influent ammonium concentration could be increased from 70 mg to 420 mg N/l, while the oxygen concentration in the reactor was maintained at 1% air saturation or less and the nitrite concentration was 20 mg N/l or less. The ammonium removal efficiency of the reactor was 85%. Dinitrogen gas was the main end product (88%). The other products were nitrate (11%), $N_2O$ (1%) and $NO_x$ (less than 1%). The production of dinitrogen gas resulted from the combined actions of two different microorganisms. This was shown by incubating sludge from the reactor in batch experiments under oxic and anoxic conditions. Under oxic conditions, the sludge converted ammonia completely to nitrite. No nitrate was produced, indicating that nitrate-producing bacteria were not present in the sludge. Some nitrate was produced under anoxic conditions, along with the conversion of nitrite and ammonia to dinitrogen gas. The conversion of ammonia and nitrite and the production of nitrate corresponded to the stoichiometry of the Anammox process. These experiments show that nitrifying bacteria and Anammox bacteria coexisted in the reactor and sequentially converted ammonia to dinitrogen gas in two steps. The nitrate produced in the reactor resulted from the Anammox process and not from nitrate-producing bacteria such as Nitrobacter.

What is claimed is:

1. A process for the biological treatment of water containing at least 50 mg/l of ammonia, wherein the water is treated with sludge containing nitrifying bacteria in an aerated reactor, applying a sludge retention time in the reactor which continuously favours nitrite-producing bacteria over nitrate-producing bacteria, characterised by controlling the sludge retention time by continuously separating part of the sludge from the reactor effluent and continuing the use of the separated part thus retained in the reactor, applying a sludge retention time which is shorter than the doubling time of the nitrate-producing bacteria and which is between 1 and 30 days, and applying a hydraulic retention time which is shorter than the sludge retention time.

2. A process according to claim 1, in which the retained part of the sludge is between 50 and 99 wt. %.

3. A process according to claim 1, in which the hydraulic retention time is less than half the sludge retention time.

4. A process according to claim 1, in which the sludge retention time is more than 1 day and the hydraulic retention time is less than 1 day.

5. A process according to claim 1, in which the sludge retention time is between 1 and 2 days.

6. A process according to claim 1, in which the dissolved oxygen concentration in the reactor is kept below 0.4 mg/l.

7. A process according to claim 6, in which nitrite is reacted with ammonia in the presence of denitrifying bacteria to produce dinitrogen in the same reactor.

8. A process according to claim 1, in which the nitrite concentration in the reactor is kept below 30 mg/l.

9. A process according to claim 1, in which the reactor is periodically converted to an anoxic mode by adding an electron donor and suppressing oxygen supply.

10. A process according to claim 1, wherein the treatment with nitrifying bacteria is followed by a separate denitrification step.

11. A process according to claim 10, in which in said denitrification step ammonia is reacted with nitrite in the presence of denitrifying bacteria to produce dinitrogen.

12. A process according to claim 10, in which liquid from said denitrification step is returned to the aerated reactor.

13. A process according to claim 1, wherein the water containing ammonia originates from scrubbing of ammonia-containing gas.

14. A process according to claim 13, wherein said scrubbing is carried out in said nitrification reactor.

* * * * *